Figure 1:
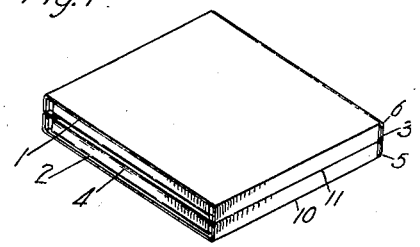

March 5, 1940.   T. HUSTON   2,192,473
CHEWING GUM PACKAGE
Filed Oct. 31, 1936

INVENTOR
Tom Huston
By
ATTORNEY

Patented Mar. 5, 1940

2,192,473

UNITED STATES PATENT OFFICE 2,192,473

CHEWING GUM PACKAGE

Tom Huston, Hartford, Conn., assignor to Shelby P. Langston, Miami, Fla.

Application October 31, 1936, Serial No. 108,625

1 Claim. (Cl. 206—46)

My invention relates to chewing gum packages.

It has among its objects to provide an improved package for chewing gum, and, more particularly, an improved package of so-called book type, adapted to open and close about a flexible portion extending longitudinally parallel to sticks of gum disposed in parallel relation in single planes on foldable gum carrying cover members. A further object of my invention is to provide such an improved construction having improved compartment means on the foldable members which enclose the opposite ends of the gum sticks in closed position, and are also of an improved construction preventing lateral loss of the gum sticks therefrom while permitting ready removal of the gum sticks when desired. A still further object of my invention is to produce such an improved package as above set forth, while having improved reenforcing edge portions disposed in an improved manner and operative to prevent crushing of the package when folded and to produce a flat attractive and convenient package adapted to maintain its shape and securely retain the gum sticks therein while the package is carried in the pocket. These and other objects and advantages of my improved construction will, however, hereinafter more fully appear.

In the accompanying drawing, I have shown for purposes of illustration one embodiment which my invention may assume in practice.

In the drawing—

Figure 2:
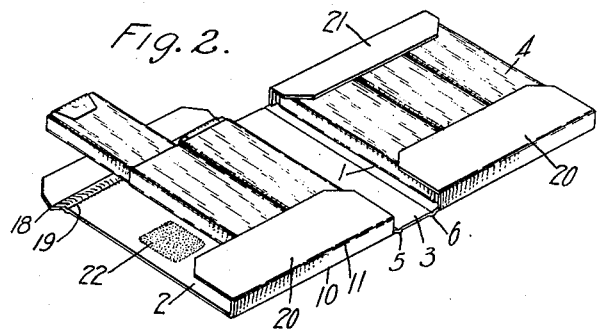

Fig. 1 is a perspective view of this form of package when folded into closed position, and Fig. 2 is another view showing this construction, one compartment means being open and one gum stick being removed and another being shown in process of removal.

Referring to the form of my invention shown in Figures 1 and 2, it will be noted that I have shown therein a package formed, as preferably, from a single sheet of relatively light cardboard and comprising two foldable cover portions having improved gum carrying compartment means thereon and foldable about an intermediate flexible portion disposed parallel to the gum sticks in the compartment means, all as hereinafter more fully described.

As shown, the package comprises gum stick carrying cover portions 1 and 2 of like construction and spaced by an intermediate flexible or connecting portion 3 disposed parallel to the gum sticks, generally indicated at 4 and disposed in parallel series in the same plane on each of the portions 1, 2. Moreover, it will be noted that the flexible portion 3 is provided with spaced parallel scoring 5 and 6 spaced apart by a distance substantially equal to the thickness of two gum sticks when superimposed. Thus, with the series of gum sticks in flat position on the portions 1 and 2, it is possible for the latter portions to be folded into the closed position shown in Figure 1 or opened as shown in Fig. 2.

Further, it will be noted that the portions 1 and 2 have compartment forming means on the inner faces thereof including portions 20 and 21 overlying the opposite ends of the gum sticks. Herein, these means include like extensions on the opposite ends of the portions 1 and 2, and each provided with transverse spaced scoring 10 and 11 spaced by a distance substantially equal to the thickness of a single gum stick. Also, the portions 20 and 21 extend from the scoring 11 toward one another over the gum sticks, but have their adjacent ends spaced from one another. Herein also note that the portions 20 and 21 are clipped at their corners at one end and extend at the other end the full width of the series of gum sticks on each portion 1 and 2. Thus it will be observed that when the two portions 1 and 2 are folded into the closed position shown in Figure 1, the opposite transverse edges of each compartment means are reenforced against collapsing by the vertical walls between the scorings 10 and 11 in such manner as to cooperate with the vertical wall between the scorings 5 and 6 in preventing collapse of the package. It will also be noted that the sheaths of the gum sticks 4 are herein suitably attached, as by adhesive 22, to the portions 1 and 2, in such manner that the sheaths cooperate in these compartment means in preventing the lateral loss of a gum stick therefrom while permitting the ready removal of a gum stick whenever desired, as by tearing it off, or by withdrawing the stick from the sheath as indicated in Figure 2.

In the use of my improved construction, the gum sticks generally indicated at 4 include usual enclosing sheaths open at the ends and the sticks are disposed in parallel series each extending longitudinally of the flexible or connecting portion 3 on opposite sides of the latter. Thus it will be evident that the gum sticks may be readily removed either by withdrawing the sticks from their sheaths while leaving the latter attached to the portions 1 and 2, or by tearing off the sticks together with their sheaths.

As a result of my improved construction, it will be noted that it is made possible to enclose both ends of the gum sticks in such manner as effectually to prevent loss thereof either longitudinally or laterally, the end walls between the scorings 10 and 11 preventing longitudinal loss and the adhesive connection of the sheaths preventing the lateral loss of a gum stick. Thus the package is well adapted to withstand rough handling. At the same time, a construction is produced which is non-collapsible at opposite ends of the gum sticks and in which the non-collapsible construction including the vertical walls between the scorings 10 and 11 at the ends thereof, cooperates with the non-collapsible structure along the flexible portion to produce a package well adapted to retain its shape during use. Further, while obtaining the above advantages, it is possible for the gum sticks to be very readily inserted quickly and conveniently and similarly removed due to my improved construction. Attention is further directed to the extremely attractive form of the package which attractively displays the gum sticks and further is adapted to carry on both faces of the package an attractively arranged display of advertising material.

While I have in this application specifically described one form which my invention may assume in practice, it will be understood that this form of the same is shown for illustrative purposes, and that the invention may be modified and embodied in various other forms without departing from its spirit or the scope of the appended claim.

What I claim as new and desire to secure by Letters Patent is:

A package having portions foldable into closed position, a flexible portion therebetween, and compartment means at opposite ends of said foldable portions disposable between the latter in closed position, said compartment means having portions overlying the opposite ends of material in said compartment means and spaced from one another and also including means for retaining articles in said compartment means against lateral loss therefrom, said overlying portion on each foldable portion being foldable back to expose the ends of articles thereon and said means for preventing lateral loss comprising article sheaths adhesively connected to said foldable portions.

TOM HUSTON.